3,210,312
ANTI-ELECTROSTATIC IMIDAZOLINE SALTS
FOR RESIN COMPOSITIONS

Milton Rosenberg, Yonkers, Hyman W. Zussman, Scarsdale, and Robert Beaudoin, Mount Vernon, N.Y., assignors to Geigy Chemical Corporation, Ardsley, N.Y., a corporation of Delaware
No Drawing. Filed July 25, 1961, Ser. No. 126,490
9 Claims. (Cl. 260—30.2)

This invention relates to a process for preventing static charge from accumulating on resins, in particular on polyvinyl chloride resins or copolymers of vinyl chloride and vinyl esters. The invention is also concerned with novel anti-static agents and compositions thereof with polyvinyl chloride-type resins. The invention also relates to preventing static charge on resins of polystyrene.

The anti-static agents of the invention are imidazoline salts, formed by reacting (i) an organic base of the Formula I:

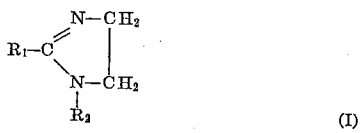

wherein $R_1$ is an alkyl group preferably, an alkyl group having from 7 to 17 carbon atoms, or an alkenyl group preferably, an alkenyl group having at least 1 double bond and from 7 to 17 carbon atoms; the most preferred groups are alkyl having 11 carbon atoms, and $R_2$ is hydroxyalkyl, especially hydroxyl(lower)alkyl, e.g. hydroxymethyl, hydroxyethyl, hydroxypropyl, hydroxybutyl, hydroxypentyl, hydroxyhexyl, preferably hydroxyethyl, with (ii) at least one of either a dibasic organic acid or hydroxy organic acid having at least one free carboxy group. Mixtures of salts also may be used. Specific acids are adipic, sebacic, isophthalic, tartaric, and mercaptosuccinic acid, but the preferred acids are adipic acid and sebacic acid. Acid salts as well as neutral salts are within the scope of the invention. Particularly valuable salts for antic-static purposes are di[1-($\beta$-hydroxyethyl)-2-undecylimidozoline]adipate, di - [1-($\beta$-hydroxyethyl)-2-undecylimidazoline]sebacate, di-[1-($\beta$-hydroxyethyl)-2-undecylimidazoline]isophthalate, di-[1-($\beta$-hydroxyethyl)-2-undecylimidazoline]tartarate, and di-[1-($\beta$-hydroxyethyl)-2-undecylimidazoline]mercaptosuccinate.

It is well known that imidazoline salts may be used for external application to polymers of vinyl chloride and interpolymers of vinyl chloride and vinyl esters as well as other polymeric resins, e.g. polystyrene, which tend to accumulate static electricity. Nevertheless, the salts of dibasic organic acids or hydroxy organic acids having at least one carboxy group, formed from the compounds of the Formula I, are surprisingly more effective as anti-static agents than presently known salts of compounds of the Formula I such as 1-($\beta$-hydroxyethyl)-2-undecylimidazoline acetate.

Other resins may be protected against static charge accumulation. Such resins are e.g. vinyl resins containing acrylonitrile, polyethylene, polypropylene, etc. The invention is also useful for preventing static build-up in paper, in inks, in protective coatings by simple incorporation of a small but effective amount of the desired antistatic agent in the substrate.

It is an object of the present invention to provide a method of stabilizing resins such as polystyrene, but preferably polyvinyl chloride or interpolymers of vinyl chloride and vinyl esters, against static charge accumulation by incorporating in said resins an effective quantity of an anti-static agent, which consists of a salt of an organic dibasic acid or hydroxy organic acid, having at least one carboxy group, of a compound of the Formula I. In particular, it is a preferred object of this invention to stabilize shaped articles of polyvinyl chloride resins or resins which are interpolymers of vinyl chloride or vinyl esters, especially phonograph records comprising said resins.

In addition to the anti-static agents, it is often desirable to incorporate other additives into the polyvinyl chloride resin. Such additives are heat stabilizers, lubricity agents, pigments or other coloring materials, etc. The heat stabilizer additive may be any suitable agent such as for example metallic salts of organic acids, i.e. cadmium, zinc, barium, lead stearates or mixtures thereof. Other stabilizers useful in polyvinyl chloride or polyvinyl acetate or in polystyrene resins may be employed. The heat stabilizer is usefully employed in an amount of from about 1% to 2% based on the weight of unstabilized resin.

The essence of the invention is not concerned with these additives, although a particular use for the shaped article may require one additive, rather than another, in varying quantities. The invention is founded on the remarkable discovery that the aforesaid novel salts are extremely effective anti-static agents, especially when compared with commercially used anti-static agents.

The following illustrate the invention, but by no means limit the scope thereof. In the examples, parts are by weight, and the relationship of parts by weight to parts by volume is as that of grams to cubic centimeters. Temperatures are in degrees centigrade.

EXAMPLE 1

69 parts 1-($\beta$-hydroxyethyl)-2-undecylimidazoline in a molten state is added to a mixture of 18.25 parts adipic acid in 87.25 parts of a 50% (weight) aqueous isopropanol solution and the resultant mixture is heated at 60° with gentle stirring for 5 minutes. It is heated at 69° for another 5 minutes and the amber liquid reaction mixture is allowed to cool to room temperature.

The di-[1-($\beta$ - hydroxyethyl) - 2 - undecylimidazoline] adipate is then added to a commercially available copolymer of vinyl chloride and vinyl acetate (Bakelite VYHH), said copolymer consisting of approximately 15% by weight of vinyl acetate and 85% by weight of vinyl chloride, so that the resulting resin contains 1% by weight of this antistatic agent. The addition of the anti-static agent to the aforesaid copolymer of vinyl chloride and vinyl acetate is effected by mixing the solution thereof at room temperature with said copolymer in the form of a powder. Thereafter, 1% by weight of barium-cadmium laurate (Advastab BC–12) is added as heat stabilizer in order to permit milling of the copolymer and anti-static agent mixture. Furthermore, 1% by weight of carbon black is also added before milling.

The milling of the foregoing polyvinyl chloride polyvinyl acetate resinous powder, mixed with the aforesaid additives, is carried out on a heated two-roller mill as follows: 309 parts of the mixture to be milled are placed upon the rollers, which are heated to 150° for a period of 5 minutes. The so-formed sheet of resinous copolymer is sheeted from the mill, cooled and cut into approximately 10 cm. squares. 130 parts of said squares are placed in a die and pressed at 132° with a force of 20 tons with a 4 square inch ram on a circular die, having a 10 inch diameter, to produce a 10 inch diameter black phonograph record. This record has very good anti-static properties.

EXAMPLE 2

Other phonograph records comprising a major portion of a copolymer of vinyl chloride and vinyl acetate (Bakelite VYHH) are produced in the same manner as described in Example 1 with good anti-static properties and with 1% by weight (based on resin) of the following anti-static agents:

Di-[1-(β-hydroxyethyl)-2-undecylimidazoline]sebacate
Di-[1-(β-hydroxyethyl)-2-undecylimidazoline]isophthalate
Di-[1-(β-hydroxyethyl)-2-undecylimidazoline]tartarate
Di-[1-(β-hydroxyethyl)-2-undecylimidazoline]mercaptosuccinate
Di-[1-(β-hydroxyethyl)-2-undecylimidazoline]maleate The anti-static agents are prepared in a manner analogous to that described in Example 1 with the proportions set forth in Table I.

*Table I*

FORMATION OF ANTI-STATIC AGENTS BY REACTING AN ORGANIC ACID WITH AN IMIDAZOLINE

| Reactants, parts by weight | | Salt |
|---|---|---|
| Organic Acid | 1-(β-hydroxyethyl) Imidazoline | |
| Adipic, 18.25 parts | 2-undecyl, 69 parts | Di-[1-(β-hydroxyethyl)-2-undecylimidazoline] adipate. |
| Sebacic, 25.28 parts | do | Di-[1-(β-hydroxyethyl)-2-undecylimidazoline] sebacate. |
| Isophthalic, 20.8 parts | do | Di-[1-(β-hydroxyethyl)-2-undecylimidazoline] isophthalate. |
| Tartaric, 12.3 parts | do | Di-[1-(β-hydroxyethyl)-2-undecylimidazoline] tartarate. |
| Mercaptosuccinic, 15.0 parts | 2-undecyl, 50 parts | Di-[1-(β-hydroxyethyl)-2-undecylimidazoline] mercaptosuccinate. |

A comparison of the anti-static properties of two typical anti-static agents according to the present invention shows their remarkably great anti-static activity in a PVC type resin.

Several phonograph records, comprising Bakelite VYHH, 1% anti-static agent, 1% carbon black and 1% heat stabilizer, produced according to Example 1, are placed in an air-tight chamber at 10% relative humidity. The chamber is fitted with mechanical means for manipulating the phonograph records and other equipment within the air-tight chamber without disturbing the relative humidity. A static detecting head is employed to detect the charge on the surface of the record, and said charge is measured with an electrometer to yield numerical values convertible to volts static charge, thus giving an exact comparative value relative to the several phonograph records tested.

A corona grid charged with 8000 volts is used to create a field through which the phonograph record is passed, and the charge retained on the record surface is measured with the electrometer at intervals of 1 and 15 minutes.

Table II shows the results of the foregoing test procedure.

*Table II*

STATIC VALUES OBSERVED FOR RESINS MILLED AT 150° FOR 5 MINUTES ON ROLL MILL

| | Total static charge measured on the surface of phonograph record | | |
|---|---|---|---|
| | 1% (wgt.) di (1-β-hydroxyethyl-2-undecylimidazoline) adipate, total charge, volts | 1% (wgt.) di (1-β-hydroxyethyl-2-undecylimidazoline) sebacate, total charge, volts | Blank (no anti-static agent), total charge, volts |
| Measurement of total charge at the end of 1 minute after charging | 180 | 300 | 3,000 |
| Measurement of total charge at the end of 15 minutes after charging | 0 | 120 | 3,000 |

EXAMPLE 3

A film of polystyrene is prepared with reduced surface charges by incorporating 0.5% by weight of di[1-(β-hydroxyethyl)-2-undecylimidazoline]adipate into the film in the following way: polystyrene pellets (Lustrex HF 66–20–20, 206) are coated with 0.5% by weight of the anti-static compound in a volatile isopropanol solution which is removed by drying in an oven at 60°. The coated pellets are extruded to form a 3.5 mil film having reduced surface charge.

What is claimed is:

1. A composition consisting essentially of (a) a polymer selected from the group consisting of (1) a polymer of vinyl chloride, (2) an interpolymer of vinyl chloride and a vinyl ester, and (3) a polymer of styrene, and (b) as an anti-electrostatic agent, an effective amount of a salt of an imidazoline of the formula

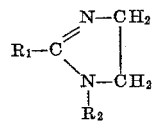

wherein
$R_1$ is alkyl having from 7 to 17 carbon atoms and
$R_2$ is hydroxyalkyl having from 1 to 6 carbon atoms, and
an acid selected from the group consisting of adipic, sebacic, isophthalic, tartaric, mercaptosuccinic and maleic.

2. A composition according to claim 1 wherein the polymer is an interpolymer of vinyl chloride and vinyl acetate.

3. A composition according to claim 1 wherein the polymer is polystyrene.

4. A composition according to claim 1 wherein the polymer is polyvinyl chloride.

5. A composition according to claim 1 wherein the polymer is polyvinyl chloride and the anti-electrostatic agent is di-[1-(β-hydroxyethyl)-2-undecylimidazoline]-adipate.

6. A composition according to claim 1 wherein the polymer is polyvinyl chloride and the anti-electrostatic agent is di-[1-(β-hydroxyethyl)-2-undecylimidazoline]-sebacate.

7. A composition according to claim 1 wherein the polymer is polyvinyl chloride and the anti-electrostatic agent is di-[1-(β-hydroxyethyl)-2-undecylimidazoline]isophthalate.

8. A composition according to claim 1 wherein the polymer is polyvinyl chloride and the anti-electrostatic agent is di-[1-(β-hydroxyethyl)-2-undecylimidazoline]-tartrate.

9. A composition according to claim 1 wherein the polymer is polyvinyl chloride and the anti-electrostatic agent is di-[1-(β-hydroxyethyl)-2-undecylimidazoline]-mercaptosuccinate.

References Cited by the Examiner

UNITED STATES PATENTS

| | | | |
|---|---|---|---|
| 2,468,180 | 4/49 | De Groote et al. | 260—309.6 |
| 2,761,787 | 9/56 | Rowe et al. | 260—30.2 |
| 2,770,607 | 11/56 | Hagemeyer et al. | 260—30.2 |
| 2,956,974 | 10/60 | De Witt et al. | 260—30.2 |
| 2,957,003 | 10/60 | Johnson | 260—309.6 |
| 2,967,868 | 1/61 | Smith | 260—309.6 |

MORRIS LIEBMAN, *Primary Examiner.*

LEON J. BERCOVITZ, *Examiner.*